(12) United States Patent
Huang

(10) Patent No.: US 10,633,833 B2
(45) Date of Patent: Apr. 28, 2020

(54) WATER CONSERVATION SYSTEM FOR USE IN BUILDING

(71) Applicant: Sizhe Chen, Cangnan County (CN)

(72) Inventor: Zhiqi Huang, Hangzhou (CN)

(73) Assignee: Sizhe Chen (CN)

( * ) Notice: Subject to any disclaimer, the term of this patent is extended or adjusted under 35 U.S.C. 154(b) by 0 days.

(21) Appl. No.: 16/087,663

(22) PCT Filed: Mar. 10, 2017

(86) PCT No.: PCT/CN2017/076245
§ 371 (c)(1),
(2) Date: Sep. 23, 2018

(87) PCT Pub. No.: WO2017/162047
PCT Pub. Date: Sep. 28, 2017

(65) Prior Publication Data
US 2019/0085535 A1 Mar. 21, 2019

(30) Foreign Application Priority Data

Mar. 24, 2016 (CN) .................... 2016 2 0231877 U
Mar. 10, 2017 (WO) ................ PCT/CN2017/076245

(51) Int. Cl.
| | |
|---|---|
| *E03B 1/04* | (2006.01) |
| *E03D 5/00* | (2006.01) |
| *E03B 7/07* | (2006.01) |
| *E03C 1/122* | (2006.01) |
| *E03C 1/12* | (2006.01) |

(52) U.S. Cl.
CPC .............. *E03B 1/042* (2013.01); *E03B 1/041* (2013.01); *E03B 1/048* (2013.01); *E03B 7/075* (2013.01); *E03D 5/003* (2013.01); *E03B 2001/045* (2013.01); *E03B 2001/047* (2013.01); *E03C 1/122* (2013.01); *E03C 2001/1206* (2013.01)

(58) Field of Classification Search
CPC .......... E03B 1/041; E03B 1/042; E03B 1/044; E03B 2001/045; E03B 2001/047
See application file for complete search history.

(56) References Cited

U.S. PATENT DOCUMENTS

| | | | | |
|---|---|---|---|---|
| 4,197,597 | A * | 4/1980 | Toms ........................ | E03B 1/04 4/300 |
| 6,132,138 | A * | 10/2000 | Haese .................... | A01N 25/00 405/37 |

(Continued)

*Primary Examiner* — Kevin F Murphy

(57) ABSTRACT

A water conservation system for use in a building comprises a water supply pipe, water-consuming equipment, a water-consuming equipment outlet pipe, an intermediate water inlet pipe, an intermediate water collection pipe, an intermediate water outlet pipe, an intermediate water outlet valve, an intermediate water overflow pipe, and a sewage pipe. The intermediate water collection pipe is installed in the building, and a water inlet and outlet of the intermediate water collection pipe is pre-arranged at every floor. The intermediate water outlet pipe and the intermediate water inlet pipe communicates with the water inlets and outlets of the intermediate water collection pipe, respectively. The intermediate water outlet pipe communicates with a toilet water tank. A first check valve is disposed on the intermediate water inlet pipe.

3 Claims, 2 Drawing Sheets

(56) References Cited

U.S. PATENT DOCUMENTS

| | | | |
|---|---|---|---|
| 2004/0168992 A1* | 9/2004 | Ben-Amotz | E03B 1/04 210/805 |
| 2006/0144769 A1* | 7/2006 | Okros | E03B 1/04 210/123 |
| 2008/0272057 A1* | 11/2008 | Tontegode | E03B 1/04 210/739 |
| 2016/0115675 A1* | 4/2016 | Quigley | E03B 1/042 700/282 |

* cited by examiner

WATER CONSERVATION SYSTEM FOR USE IN BUILDING

TECHNICAL FIELD OF THE INVENTION

The present invention relates to the technical field of water conservation systems, and more particularly, to a water conservation system for use in a building.

BACKGROUND OF THE INVENTION

When a water tap is turned on, water flows out continuously. It's easy to think that freshwater will always be plentiful, and the threat of an impending water crisis will rarely happen. However, freshwater is incredibly rare. A mere 0.014% of all water on earth is both fresh and easily accessible. As a result, some 1.1 billion people worldwide lack access to clean water, and every year a total of 3.1 million suffer and die from water-borne illnesses caused by inadequate sanitation. In the near future, two-thirds of the world's population may face water scarcity. In 1992, the United Nations General Assembly adopted a resolution by which 22 March of each year was declared World Day for Water. Statistically, each urban resident consumes 30-50 liters of water per day for flushing the toilet. When calculating on the basis of 7.5 billion population, the water consumed by the flush-toilets every day in China reaches 30 million tons (the storage water amount of the West Lake is 14 million tons), excluding the water consumption of flush-toilets in rural areas. In the prior art, a waste water container is arranged between every two adjacent floors, resulting in a huge amount of construction work and a high spatial occupation. As water leakage frequently occurs, the maintenance cost is high. Moreover, the intermediate water cannot be cross-floor utilized. In conclusion, it's urgent for those skilled in this field to develop a novel water conservation system for use in a building.

SUMMARY OF THE INVENTION

The purpose of the present invention is to solve the shortcomings in the prior art by providing a water conservation system for use in a building.

To achieve the above purpose, the present invention adopts the following technical solution:

A water conservation system for use in a building comprises a water supply pipe, water-consuming equipment, a water-consuming equipment outlet pipe, an intermediate water inlet pipe, an intermediate water collection pipe, an intermediate water outlet pipe, an intermediate water outlet valve, an intermediate water overflow pipe and a sewage pipe; the intermediate water collection pipe is installed in the building, and a water inlet and outlet of the intermediate water collection pipe is pre-arranged at every floor; the intermediate water outlet pipe and the intermediate water inlet pipe are respectively communicated with the water inlets and outlets of the intermediate water collection pipe; the intermediate water outlet pipe is communicated with a toilet water tank; a first check valve is disposed on the intermediate water inlet pipe; the water-consuming equipment outlet pipe is connected to a water outlet side pipe; the water outlet side pipe is communicated with the sewage pipe; the intermediate water overflow pipe is communicated with the intermediate water collection pipe and the sewage pipe.

In another aspect of the present invention, the intermediate water collection pipe is communicated with a rainwater collection pipe through the pipeline A. A third check valve is disposed on the pipeline A.

In another aspect of the present invention, a rainwater collection slope is arranged on a building roof, and the rainwater collection slope is communicated with the top portion of the intermediate water collection pipe.

In another aspect of the present invention, a rainwater collection slope is arranged on a building roof, and the rainwater collection slope is communicated with the top portion of the rainwater collection pipe.

In another aspect of the present invention, the water supply pipe is connected to the water supply side pipe, and the water supply side pipe is communicated with the toilet water tank. A second check valve and the floating-ball valve are disposed on the water supply side pipe.

In another aspect of the present invention, the intermediate water drainpipe A and the intermediate water drainpipe B are connected to the bottom of the intermediate water collection pipe. The intermediate water drainpipe A and the intermediate water drainpipe B are communicated with the sewage pipe. A first valve is disposed on the intermediate water drainpipe A, and a first pressure valve is disposed on the intermediate water drainpipe B.

In another aspect of the present invention, a third valve is disposed on the pipeline A. A rainwater drainpipe A and a rainwater drainpipe B are connected to the bottom of the rainwater collection pipe. The rainwater drainpipe A and the rainwater drainpipe B are communicated with the sewage pipe. A second valve is disposed on the rainwater drainpipe A, and a second pressure valve is disposed on the rainwater drainpipe B.

In another aspect of the present invention, the top portion of the rainwater collection pipe is communicated with that of the intermediate water collection pipe through the pipeline B. A fourth check valve is disposed on the pipeline B.

In another aspect of the present invention, the diameter of the intermediate water collection pipe is greater than that of the intermediate water inlet pipe, and the diameter of the rainwater collection pipe is greater than that of the intermediate water collection pipe.

In another aspect of the present invention, the water outlet side pipe is disposed above the intermediate water inlet pipe.

Compared with the prior art, the present invention has the following advantages:

The present invention has a novel and reasonable structure, and can be conveniently used. A straight-through intermediate water collection pipe is adopted to replace the traditional waste water container installed at each floor, greatly saving the space and reducing the amount of construction work. The intermediate water can be prevented from flowing into the water-consuming equipment. As the intermediate water can be used to flush toilets instead of running water, the water source can be significantly saved, making a great contribution to human beings.

BRIEF DESCRIPTION OF THE DRAWINGS

To clearly expound the technical solution of the present invention, the drawings and embodiments are hereinafter combined to illustrate the present invention. Obviously, the drawings are merely some embodiments of the present invention and those skilled in the art can associate themselves with other drawings without paying creative labor.

MARKING INSTRUCTIONS OF THE DRAWINGS

1—Water Supply Pipe, 2—Water-consuming Equipment, 3—Water-consuming Equipment Outlet Pipe, 4—Intermediate Water Inlet Pipe, 5—The First Check Valve, 6—Water Outlet Side Pipe, 7—Intermediate Water Collection Pipe, 8—Intermediate Water Outlet Pipe, 9—Water Supply Side Pipe, 10—The Second Check Valve, 11—Toilet Water Tank, 12—Floating-ball Valve, 13—Intermediate Water Outlet Valve, 14—Intermediate Water Overflow pipe, 15—Sewage Pipe, 16—Sewage Pool, 17—The First Pressure Valve, 18—The First Valve, 19—The Second Pressure Valve, 20—The Second Valve, 21—Pipeline A, 22—The Third Check Valve, 23—The Third Valve, 24—Building Roof, 25—Rainwater Collection Slope, 26—Pipeline C, 27—Rainwater Collection Pipe, 28—The Fourth Check Valve, 29—Pipeline B, 30—Intermediate Water Drainpipe A, 31—Intermediate Water Drainpipe B, 32—Rainwater Drainpipe A, 33—Rainwater Drainpipe B

DETAILED DESCRIPTION OF THE INVENTION

Drawings and detailed embodiments are combined hereinafter to elaborate the technical principles of the present invention.

Figure 1:
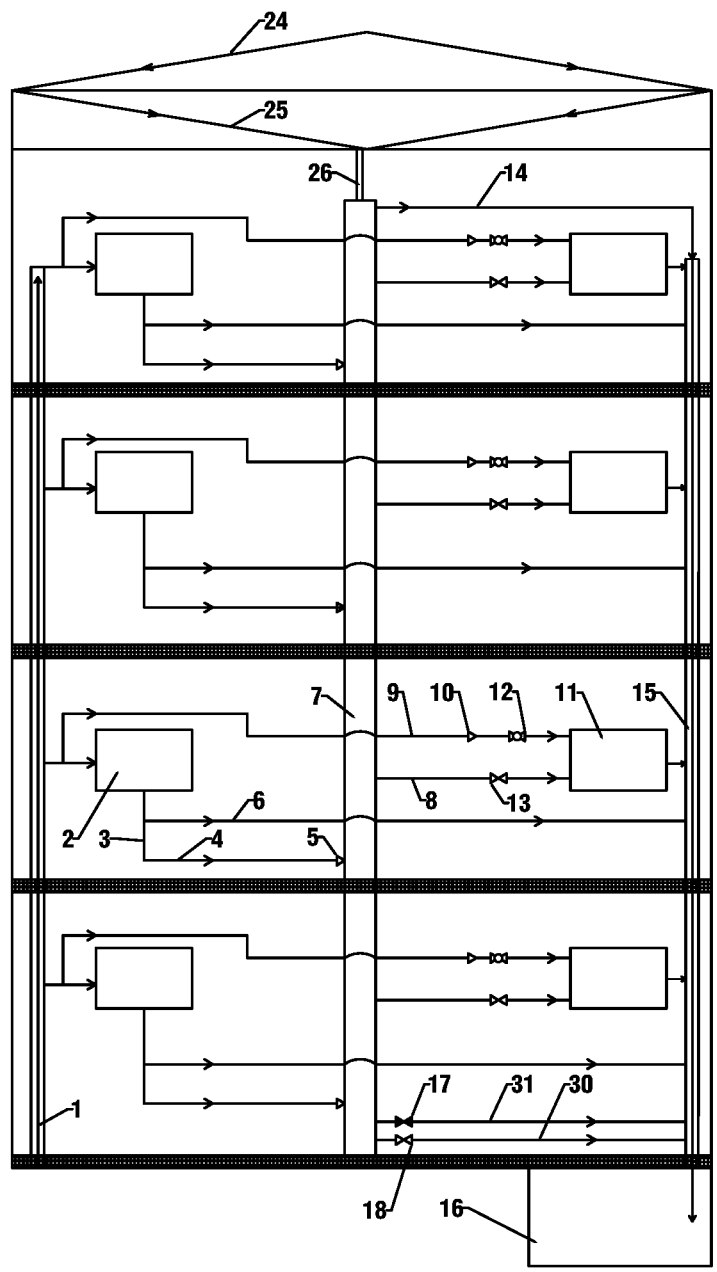
FIG. 1 is a structural diagram of the present invention.
Figure 2:
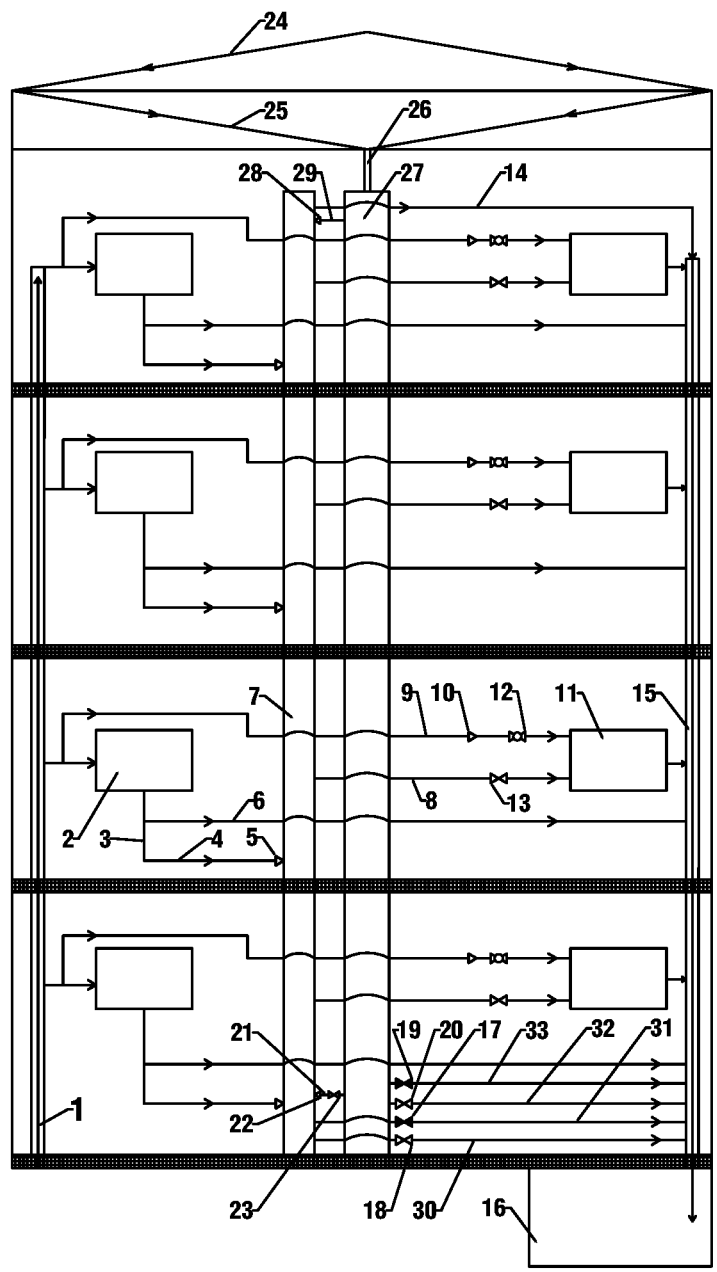
FIG. 2 is another structural diagram of the present invention.

In this embodiment, the second floor is taken as an example. As shown in FIGS. 1-2, the water conservation system for use in a building comprises a water supply pipe 1, water-consuming equipment 2, a water-consuming equipment outlet pipe 3, an intermediate water inlet pipe 4, an intermediate water collection pipe 7, an intermediate water outlet pipe 8, an intermediate water outlet valve 13, an intermediate water overflow pipe 14 and a sewage pipe 15. The intermediate water collection pipe 7 is installed in the building, and a water inlet and outlet of the intermediate water collection pipe 7 is pre-arranged at every floor. The intermediate water outlet pipe 8 and the intermediate water inlet pipe 4 are respectively communicated with the water inlets and outlets of the intermediate water collection pipe 7. The intermediate water outlet pipe 8 is communicated with a toilet water tank 11. The intermediate water outlet valve 13 is disposed on the intermediate water outlet pipe 8. A first check valve 5 is disposed on the intermediate water inlet pipe 4. When the intermediate water is not needed, the intermediate water outlet valve 13 can be turned-off, and the first check valve 5 can prevent the intermediate water from flowing back into the water-consuming equipment 2.

The water-consuming equipment outlet pipe 3 is connected to a water outlet side pipe 6. The water outlet side pipe 6 is communicated with the sewage pipe 15. The water level in the intermediate water collection pipe 7 varies along the amount of the intermediate water that flows in through the intermediate water inlet pipe 4 and the first check valve 5, the rainwater that flows in through the pipeline A21 and the pipeline B29, the intermediate water discharged from the intermediate water outlet pipe 8 and the intermediate water outlet valve 13, and the intermediate water discharged from an intermediate water drainpipe A30 and an intermediate water drainpipe B31. Namely, the water level in intermediate water collection pipe 7 varies continuously.

When the water level in the intermediate water collection pipe 7 is higher than that in the intermediate water inlet pipe 4, the water discharged from the water-consuming equipment 2 cannot flow into the intermediate water collection pipe 7 through the intermediate water inlet pipe 4 and the first check valve 5. At this point, the discharged water flows into the sewage pipe 15 through the water outlet side pipe 6. When the water level in the intermediate water collection pipe 7 is lower than that in the intermediate water inlet pipe 4, the water discharged from the water-consuming equipment 2 flows into the intermediate water collection pipe 7 through the intermediate water inlet pipe 4 and the first check valve 5. When the water level in the intermediate water collection pipe 7 is higher than that in the intermediate water outlet pipe 8, a floating-ball valve 12 is automatically turned-off. As a result, the intermediate water in the intermediate water collection pipe 7 flows into the toilet water tank 11 instead of the running water through the intermediate water outlet pipe 8 and the intermediate water outlet valve 13, thereby achieving a water-saving effect. On the contrary, when the water level in the intermediate water collection pipe 7 is lower than that in the intermediate water outlet pipe 8, the floating-ball valve 12 is automatically turned-on. The running water enters into the toilet water tank 11 through a water supply side pipe 9, a second check valve 10 and the floating-ball valve 12. At this moment, water cannot be saved.

The intermediate water overflow pipe 14 is communicated with the intermediate water collection pipe 7 and the sewage pipe 15. By means of this design, the water in the intermediate water collection pipe 7 can be prevented from overflowing when reaching the top of intermediate water collection pipe 7, and the water pressure in the intermediate water collection pipe 7 can be effectively relieved. The intermediate water drainpipe A30 and the intermediate water drainpipe B31 are connected to the bottom of the intermediate water collection pipe 7. The intermediate water drainpipe A30 and the intermediate water drainpipe B31 are communicated with the sewage pipe 15. A first valve 18 is disposed on the intermediate water drainpipe A30, and a first pressure valve 17 is disposed on the intermediate water drainpipe B31. When the intermediate water collection pipe 7 is filled with water for a long time, the first valve 18 can be turned on, thereby releasing the intermediate water held in the intermediate water collection pipe 7 while rinsing the impurities left at the bottom of the intermediate water collection pipe 7. At this point, a third valve 23 is turned-off. When the intermediate water overflow pipe 14 is blocked, the water in the intermediate water collection pipe 7 cannot be used. However, the water-consuming equipment 2 continuously discharges water into the intermediate water collection pipe 7, thereby forming a high pressure therein. Under such a circumstance, the first pressure valve 17 disposed on the intermediate water drainpipe B31 can protect the pipelines and the check valves from being damaged. Namely, when the pressure is excessively high, the first pressure valve 17 is automatically turned-on to release water, thereby protecting the related pipelines and valves.

The water supply pipe 1 is connected to the water supply side pipe 9, and the water supply side pipe 9 is communicated with the toilet water tank 11. A second check valve 10 and the floating-ball valve 12 are disposed on the water supply side pipe 9. The aforesaid design is useful for families that don't use intermediate water, and is applicable when the intermediate water supply is not sufficient. Namely, when the intermediate water outlet valve 13 is turned-off, or when the intermediate water stored in the toilet water tank 11 is insufficient, the floating-ball valve is automatically turned-on to supply water to the toilet water tank 11. Thus, a humanization design can be achieved. Furthermore, a rainwater collection slope 25 is arranged on a building roof 24, and the rainwater collection slope 25 is communicated with the top portion of the intermediate water collection pipe 7. Thus, the rainwater can be directly collected and used as the intermediate water during rainy days. The rainwater is cleaner than the intermediate water. Meanwhile, the intermediate water in the intermediate water pipe can be simply neutralized. In this way, the water can be kept relatively clean, further completing the whole water conservation system.

In rainy regions, the intermediate water collection pipe 7 is communicated with a rainwater collection pipe 27 through the pipeline A21, thereby utilizing the rainwater in a better way. A third check valve 22 is disposed on the pipeline A21 so that the rainwater in the rainwater collection pipe 27 can only flow into the intermediate water collection pipe 7 and cannot flow back. At this point, the rainwater collection slope 25 is pre-communicated with the top portion of the rainwater collection pipe 27. The third valve 23 is disposed on the pipeline A21. A rainwater drainpipe A32 and a rainwater drainpipe B33 are connected to the bottom of the rainwater collection pipe 27. The rainwater drainpipe A32 and the rainwater drainpipe B33 are communicated with the sewage pipe 15. The second valve 20 is disposed on the rainwater drainpipe A32, and a second pressure valve 19 is disposed on the rainwater drainpipe B33. When rinsing the rainwater collection pipe 27, the second valve 20 is turned on. Thus, the water can be released to rinse the rainwater collection pipe 27. The top portion of the rainwater collection pipe 27 is communicated with the top portion of the intermediate water collection pipe 7 through the pipeline B29. A fourth check valve 28 is disposed on the pipeline B29. When there's too much water in the rainwater collection pipe 27, the water can be discharged into the intermediate water collection pipe 7 through the fourth check valve 28. When the fourth check valve 28 or the intermediate water overflow pipe is blocked, and a high pressure is formed as rainwater continuously flows into the rainwater collection pipe 27, the second pressure valve 19 is turned on (similar to the first pressure valve), thereby protecting the related pipelines and valves from being damaged.

Additionally, the diameter of the intermediate water collection pipe 7 is greater than that of the intermediate water inlet pipe 4, and the diameter of the rainwater collection pipe 27 is greater than that of the intermediate water collection pipe 7. The intermediate water collection pipe 7 or the rainwater collection pipe 27 is communicated with the rainwater collection slope 25 through a pipeline C26. The water in the rainwater collection pipe 27 can be used for irrigating, washing cars, watering, etc. When valves are installed at the corresponding floors, the water can be used for rinsing the corridors and stairs. Certainly, in order to make the water more sanitary, disinfectants or deodorants can be properly added into the intermediate water collection pipe.

The description of above embodiments allows those skilled in the art to realize or use the present invention. Without departing from the spirit and essence of the present invention, those skilled in the art can combine, change or modify correspondingly according to the present invention. Therefore, the protective range of the present invention should not be limited to the embodiments above but conform to the widest protective range which is consistent with the principles and innovative characteristics of the present invention. Although some special terms are used in the description of the present invention, the scope of the invention should not necessarily be limited by this description. The scope of the present invention is defined by the claims.

The invention claimed is:

1. A water conservation system for use in a building, comprising:
    a water supply pipe,
    water-consuming equipment,
    a water-consuming equipment outlet pipe,
    an intermediate water inlet pipe,
    an intermediate water collection pipe,
    an intermediate water outlet pipe,
    an intermediate water outlet valve,
    an intermediate water overflow pipe, and
    a sewage pipe, wherein the intermediate water collection pipe is installed in the building, and a water inlet and outlet of the intermediate water collection pipe is pre-arranged at every floor, wherein the intermediate water outlet pipe and the intermediate water inlet pipe are respectively communicated with the water inlets and outlets of the intermediate water collection pipe, wherein the intermediate water outlet pipe is communicated with a toilet water tank, wherein a first check valve is disposed on the intermediate water inlet pipe, wherein the water-consuming equipment outlet pipe is connected to a water outlet side pipe, wherein the water outlet side pipe is communicated with the sewage pipe, wherein the intermediate water overflow pipe is communicated with the intermediate water collection pipe and the sewage pipe, wherein the intermediate water collection pipe is communicated with a rainwater collection pipe through-a first pipeline, wherein a third check valve is disposed on the first pipeline, wherein a third valve is disposed on the first pipeline, wherein a first rainwater drainpipe and a second rainwater drainpipe are connected to the bottom of the rainwater collection pipe, wherein the first rainwater drainpipe and the second rainwater drainpipe are communicated with the sewage pipe, wherein a second valve is disposed on the first rainwater drainpipe, and a second pressure valve is disposed on the second rainwater drainpipe.

2. A water conservation system for use in a building, comprising:
    a water supply pipe,
    water-consuming equipment,
    a water-consuming equipment outlet pipe,
    an intermediate water inlet pipe,
    an intermediate water collection pipe,
    an intermediate water outlet pipe,
    an intermediate water outlet valve,
    an intermediate water overflow pipe, and
    a sewage pipe, wherein the intermediate water collection pipe is installed in the building, and a water inlet and outlet of the intermediate water collection pipe is pre-arranged at every floor, wherein the intermediate water outlet pipe and the intermediate water inlet pipe are respectively communicated with the water inlets and outlets of the intermediate water collection pipe, wherein the intermediate water outlet pipe is communicated with a toilet water tank, wherein a first check valve is disposed on the intermediate water inlet pipe, wherein the water-consuming equipment outlet pipe is connected to a water outlet side pipe, wherein the water outlet side pipe is communicated with the sewage pipe, wherein the intermediate water overflow pipe is communicated with the intermediate water collection pipe and the sewage pipe, wherein the intermediate water collection pipe is communicated with a rainwater collection pipe through-a first pipeline, wherein a third check valve is disposed on the first pipeline, wherein a third valve is disposed on the first pipeline, wherein a rainwater collection slope is arranged on a building roof, and the rainwater collection slope is communicated with the top portion of the rainwater collection pipe, wherein a third valve is disposed on the first pipeline, wherein a first rainwater drainpipe and a second rainwater drainpipe are connected to the bottom of the rainwater collection pipe, wherein the first rainwater drainpipe and the second rainwater drainpipe are communicated with the sewage pipe, wherein a second valve is disposed on the first rainwater drainpipe, and a second pressure valve is disposed on the second rainwater drainpipe.

3. A water conservation system for use in a building, comprising:
a water supply pipe,
water-consuming equipment,
a water-consuming equipment outlet pipe,
an intermediate water inlet pipe,
an intermediate water collection pipe,
an intermediate water outlet pipe,
an intermediate water outlet valve,
an intermediate water overflow pipe, and
a sewage pipe, wherein the intermediate water collection pipe is installed in the building, and a water inlet and outlet of the intermediate water collection pipe is pre-arranged at every floor, wherein the intermediate water outlet pipe and the intermediate water inlet pipe are respectively communicated with the water inlets and outlets of the intermediate water collection pipe, wherein the intermediate water outlet pipe is communicated with a toilet water tank, wherein a first check valve is disposed on the intermediate water inlet pipe, wherein the water-consuming equipment outlet pipe is connected to a water outlet side pipe, wherein the water outlet side pipe is communicated with the sewage pipe, wherein the intermediate water overflow pipe is communicated with the intermediate water collection pipe and the sewage pipe, wherein the intermediate water collection pipe is communicated with a rainwater collection pipe through-a first pipeline, wherein a third check valve is disposed on the first pipeline, wherein a third valve is disposed on the first pipeline, wherein the diameter of the intermediate water collection pipe is greater than that of the intermediate water inlet pipe, and the diameter of the rainwater collection pipe is greater than that of the intermediate water collection pipe.

* * * * *